(12) United States Patent
Sabourin

(10) Patent No.: US 6,208,964 B1
(45) Date of Patent: Mar. 27, 2001

(54) METHOD AND APPARATUS FOR PROVIDING UNSUPERVISED ADAPTATION OF TRANSCRIPTIONS

(75) Inventor: Michael Sabourin, Saint-Lambert (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/144,065

(22) Filed: Aug. 31, 1998

(51) Int. Cl.$^7$ .............................. G10L 15/06; G10L 15/26
(52) U.S. Cl. .......................... 704/244; 704/235; 704/251; 704/254
(58) Field of Search .................................. 704/235, 251, 704/254, 243, 244

(56) References Cited

U.S. PATENT DOCUMENTS

| 4,164,025 | 8/1979 | Dubnowski et al. | 707/533 |
|---|---|---|---|
| 4,751,737 | 6/1988 | Gerson et al. | 704/243 |
| 4,797,910 | 1/1989 | Daudelin | 379/88.01 |
| 4,959,855 | 9/1990 | Daudelin | 379/213 |
| 4,979,206 | 12/1990 | Padden et al. | 379/88.01 |
| 5,050,215 | 9/1991 | Nishimura | 704/256 |

(List continued on next page.)

OTHER PUBLICATIONS

1998 Institution of Electrical Engineers, "Reversible letter–to–sound/sound–to–letter, generation based on parsing word morphology", Meng, H., Hunnicutt, S., Seneff, S., Zue, V. pp 47–63.

1998 Institution of Electrical Engineers, "Automatic phonetic baseform determination", Bahl, L.R.., Das, S. de Souza, P.V. Epstein, M., Mercer, R.L. pp 173–176.

"Automatic Transcription of Unknown Words in a Speech recognition System", R. Haeb–Umbach, P. Beyerlein, E. Thelen, 1995IEE, pp 840–843.

Creating Speaker–Specific Phonetic Templates with a Speaker–Independent Phonetic Recognizer; implications for Voice Dialing, Neena Jain, Ronald Cole and Etienne Barnard, 1996IEE, pp 881–884.

"Putting Speech Recognition to Work in the Telephone Network", Matthew Lennig, Bell–Northern Research and INRS–Telecommunications, Aug. 1990, pp 35–39.

(List continued on next page.)

Primary Examiner—Tālivaldis I. Šmits

(57) ABSTRACT

An adaptive speech recognition system is provided including an input for receiving a signal derived from a spoken utterance indicative of a certain vocabulary item, a speech recognition dictionary, a speech recognition unit and an adaptation module. The speech recognition dictionary has a plurality of vocabulary items each being associated to a respective dictionary transcription group. The speech recognition unit is in an operative relationship with the speech recognition dictionary and selects a certain vocabulary item from the speech recognition dictionary as being a likely match to the signal received at the input. The results of the speech recognition process are provided to the adaptation module. The adaptation module includes a transcriptions bank having a plurality of orthographic groups, each including a plurality of transcriptions associated with a common vocabulary item. A transcription selector module in the adaptation module retrieves a given orthographic group from the transcriptions bank on a basis of the vocabulary item recognized by the speech recognition unit. The transcription selector module processes the given orthographic group on the basis of the signal received at the input to select a certain transcription from the transcriptions bank. The adaptation module then modifies a dictionary transcription group corresponding to the vocabulary item selected as being a likely match to the signal received at the input on the basis of the selected certain transcription.

23 Claims, 5 Drawing Sheets

U.S. PATENT DOCUMENTS

| | | | |
|---|---|---|---|
| 5,052,038 | | 9/1991 | Shepard .............................. 379/88.09 |
| 5,086,479 | | 2/1992 | Takenaga et al. .................... 382/157 |
| 5,091,947 | | 2/1992 | Ariyoshi et al. ..................... 704/246 |
| 5,097,509 | | 3/1992 | Lennig ................................. 704/240 |
| 5,127,055 | | 6/1992 | Larkey ................................. 704/244 |
| 5,163,083 | | 11/1992 | Dowden et al. ................... 379/88.03 |
| 5,181,237 | | 1/1993 | Dowden et al. ................... 379/88.03 |
| 5,195,167 | | 3/1993 | Bahl et al. ........................... 704/200 |
| 5,204,894 | | 4/1993 | Darden ............................... 379/88.03 |
| 5,274,695 | | 12/1993 | Green ................................. 379/88.02 |
| 5,488,652 | | 1/1996 | Bielby et al. ...................... 379/88.03 |
| 5,515,475 | | 5/1996 | Gupta et al. ......................... 704/242 |
| 5,664,058 | * | 9/1997 | Vysotsky ............................. 704/243 |
| 5,799,273 | * | 8/1998 | Mitchell et al. ..................... 704/235 |
| 5,960,447 | * | 9/1999 | Holt et al. ............................ 707/500 |
| 5,983,177 | * | 11/1999 | Wu et al. ............................. 704/244 |

OTHER PUBLICATIONS

"Dynamic Adaptation of Hidden Markov Model for Robust Speech Recognition", Gao Yu–qing, Chen Yong–bin, Wu Bo–xiu; 1989IEEE, pp 1336–1339.

"Fast Search Strategy in a large Vocabulary Word recognizer", V.N. Gupta, M. Lennig and P. Mermelstein, 1988 Acoustical Society of America, pp 2007–2017.

"An Introduction to Hidden Markov Models", L.R. Rabiner, B.H. Juang, IEEE ASSP Magazine, Jan. 1986 pp. 4–16.

"Automatic Rule–based Generation of Word Pronunciation Networks", Nick Cremelie and Jean–Pierre Martens, Eurospeech 97, Rhodex, ISSN 1018–4074, pp 2459–2462.

"Modeling Pronunciation Variation for ASR: Overview and Comparison of Methods", Helmer Strik, Catia Cucchiarini, Rolduc, May 4–6, 1998, pp 137–143.

"Maximum Likelihood Modelling of Pronunciation Variation", Trym Holter and Torbjorn Svendesen, Rolduc, May 4–6, 1998, pp 63–66.

* cited by examiner

METHOD AND APPARATUS FOR PROVIDING UNSUPERVISED ADAPTATION OF TRANSCRIPTIONS

FIELD OF THE INVENTION

This invention relates to the field of automatically performing desired actions in response to spoken requests. It is particularly applicable to a method and an apparatus for adapting a speech recognition dictionary, as may be used to automate partially or fully the training of a speech recognition dictionary in a speech recognition system. The method and apparatus may be used to train a speech recognition dictionary for a telephone directory assistance system, voice activated dialing (VAD), credit card number identification and other speech recognition enabled services.

BACKGROUND OF THE INVENTION

In addition to providing printed telephone directories, telephone companies provide information services to their subscribers. The services may include stock quotes, directory assistance and many others. In most of these applications, when the information requested can be expressed as a number or number sequence, the user is required to enter his request via a touch tone telephone. This is often aggravating for the user since he is usually obliged to make repetitive entries in order to obtain a single answer. This situation becomes even more difficult when the input information is a word or phrase. In these situations, the involvement of a human operator may be required to complete the desired task.

Because telephone companies are likely to handle a very large number of calls per year, the associated labour costs are very significant. Consequently, telephone companies and telephone equipment manufacturers have devoted considerable efforts to the development of systems that reduce the labour costs associated with providing information services on the telephone network. These efforts comprise the development of sophisticated speech processing and recognition systems that can be used in the context of telephone networks.

In typical speech recognition systems, the user enters his request using isolated word, connected word or continuous speech via a microphone or telephone set. The request may be a name, a city or any other type of information for which either a function is to be performed or information is to be supplied. If valid speech is detected, the speech recognition layer of the system is invoked in an attempt to recognize the unknown utterance. Typically entries in a speech recognition dictionary, usually including transcriptions associated to labels, are scored in order to determine the most likely match to the utterance.

Commonly, the speech recognition dictionary is created by obtaining transcriptions of words, each component of the transcription being associated with an acoustic model. This operation is usually performed when the speech recognition system is built or at the time of installation. However, the initial transcription content of the speech recognition dictionary may inadequately model the pronunciation of certain words. Furthermore, the speech recognition system may be unable to track the time varying aspect of the pronunciation of words in a language leading to performance degradation over time. Typically, many transcriptions are stored for each orthography in the speech recognition vocabulary in order to model the different pronunciations of the orthography. However, to allow real-time performance of the speech recognition system, only a limited number of transcriptions are stored for each word and the correct transcription may not be chosen to be added to the speech recognition dictionary by the training system. Finally, the training of the speech recognition dictionary is limited to information available in a fixed observation period and events not occurring within the observation period are often not well modelled.

One way to improve the performance of a speech recognition system under these conditions is to make use of past utterance usage. Using this existing knowledge, the speech recognition system is modified to better reflect the utterances received by the system. These techniques are commonly referred to as adaptation techniques. Adaptation attempts to correct the shortcomings of the initial configuration of the speech recogniser. Typical adaptation algorithms can adapt to changes in the speech source, such as changes in the speaker population, as well as changes in the application lexicon, such as modifications made by a system administrator. In principle, almost any parameter in a pattern recognition system can be adapted. Two categories of adaptation can be distinguished namely supervised adaptation and unsupervised adaptation.

Supervised adaptation involves human intervention, typically that of a phonetician who will correct labels. Supervised adaptation also requires storage of a batch of data, transferring data for validation purposes, and offline computing resources. It requires a large corpus of labelled speech and usually requires a high level of labelling accuracy in order to obtain improved performance of the speech recogniser. In a typical interaction, a phonetician transcribes each sample of speech and labels it with its corresponding orthography and transcription (e.g. Phonetic spelling) and noise codes. The transcriptions generated in this fashion are then entered into the speech recognition dictionary. This operation is time consuming and the labour costs associated with the expert phoneticians are significant. Furthermore, tracking the evolution of word pronunciation requires frequent training sessions and is impractical. In order to reduce the labour costs associated with the generation of transcriptions, systems providing unsupervised or automatic adaptation have been developed.

Unsupervised adaptation, herein referred to as automatic adaptation, involves little or no human intervention. It requires a large corpus of labelled speech and usually does not require a high level of labelling accuracy in order to obtain improved performance of the speech recogniser. In a specific example the labelled speech is generated by the speech recognizer or by a human operator.

A common method of finding the most suitable transcription from a set of transcriptions is to find the transcription, T*, which maximises the equation p (U/T) p (T/L) where p (U/T) is the acoustic model score from the speech recognizer (e.g. the probability that the transcription corresponds to a given sample of speech) and p (T/L) is the language model probability (the probability of the transcription given the language model). When the word identity is known with certainty, then p(T/L) becomes p(T/W), the probability of a transcription given a fixed word. Typically, P (T/W) is difficult to assess and a constant value is generally used. When multiple examples of a word are available, then the logarithm of p(U/T) is summed, and the transcription which minimises the summed log p(U/T) is taken. For a more detailed discussion of this method, the reader is invited to consult L. R. Bahl et al. "Automatic phonetic baseform determination", 1991, IEEE; D. Hunnicutt et al. "Reversible letter-to-sound and sound-to-letter generation based on parsing word morphology", and R. Haeb-Umbach et al. "Automatic transcription of unknown words in a speech recognition system", 1995, IEEE. The contents of these documents is hereby incorporated by reference.

A deficiency of the above described method is that the transcription T* is selected from a fixed set of transcriptions. This does not allow the system to adapt to the time varying nature of speech as well as does not allow the speech recognition system to learn from past speech utterances.

Thus, there exists a need in the industry to refine the process of automatically adapting a speech recognition system.

OBJECTS AND STATEMENT OF THE INVENTION

An object of the invention is to provide an improved method and apparatus for generating a transcription capable of being used to create an entry in a speech recognition dictionary for a certain word.

A more specific object of the invention is to provide a method and apparatus that utilize a signal representative of audio information produced when uttering a certain word that is input to a speech recognition system along with the vocabulary item selected by the speech recognition system as being a match to the uttered word, in order to fine tune the transcription for the certain word that is stored in the dictionary of the speech recognition system.

A further object of the invention is to provide a computer readable storage medium containing a novel program element that instructs a computer to generate a transcription capable of being used to create an entry in a speech recognition dictionary for a certain word.

Another object of the present invention is to provide a speech recognition system that offers improved task adaptation capabilities.

As embodied and broadly described herein the invention provides an apparatus for generating a transcription capable of being used to create an entry in a speech recognition dictionary for a certain word, said apparatus comprising:
- a machine readable storage medium containing a transcriptions bank, said transcriptions bank comprising a plurality of orthographic groups, each orthographic group including a plurality of transcriptions associated with a common word,
- an input for receiving:
  a) a signal representative of audio information produced when a user utters a certain word;
  b) a label element associated with said signal;
- a transcription selector module for:
  a) retrieving on a basis of said label element the orthographic group corresponding to the certain word;
  b) processing said signal to select a certain transcription from said orthographic group corresponding to the certain word;
- an output for delivering the certain transcription capable of being used for creating an entry in the speech recognition dictionary.

For the purpose of this specification, the expression "word" designates a textual representation of a spoken utterance. In a specific example, a textual representation is a collection of written symbols or characters that are components of an alphabet.

For the purpose of this specification, the expressions "orthographic representation" and "orthography" are used interchangeably. An "orthography" is a data element in a machine-readable form that is an electronic representation of a word. Typically, an orthography is a collection of symbols mapped to the characters forming the word. The expression "orthography" also includes data structures including solely or in part pointers or links to locations, such as in a memory for example that contain the actual representation of the word.

For the purpose of this specification, the expression "orthographic group" is used to designate a set of transcriptions (see definition below) associated with a common word. The expression "orthographic group" may also contain the orthography of the word associated with the transcriptions in the group.

For the purpose of this specification, the expression "utterance" is a sound or combination of sounds that form a meaningful linguistic unit.

For the purpose of this specification, the expression "transcription" is used to designate a machine readable data element that is a combination of symbols providing information on how a sub-word unit, such as a letter or a combination of letters, may be pronounced. For example, a simple word like "a" is often pronounced as /ey/ in isolation but as /ax/ in context. Another example is a word like "data" which can be pronounced as /d ey t ax/ or /d æ t ax/ depending on the speaker's dialect. Typically a word may have several transcriptions, where each transcription may be a different pronunciation of the word. The symbols that compose a transcription may be phonemes, allophones, triphones, syllables and dyads (demi-syllables). The expression "allophonic transcription" is used to designate a transcription where the sub-word units are allophones and the expression "phonemic transcription" is used to designate a transcription where the sub-word units are phonemes. A phonemic transcription may have multiple corresponding allophonic transcriptions. Although the definition of "transcription" herein refers to a data structure including symbols, it should be understood that what is meant is a data element having constituent parts that are representations of the symbols. The table below illustrates examples of words (or orthographies) and the associated transcriptions.

| KEYWORD | TRANSCRIPTION |
| --- | --- |
| "COMPOSE" | < k1*4m6-p1o2z0> |
| "SLOW DOWN" | < s8l9o3__d1aw0n15> |

In the above table, each alphanumeric character in the transcription is an allophone. The character is a phoneme and the digits following the character indicate a variation of the phoneme in a certain acoustic context (allophone). The "__" character is the inter-word silence and "-" is the syllabic mark.

For the purpose of this specification, the expressions "model" and "speech recognition model" are used to designate a mathematical representation of a speech signal. Speech modeling is well known in the art of speech recognition. Commonly used models in speech recognition are Hidden Markov Models (HMMs) where each phoneme can be represented by a sequence of states and transition in between these states. For basic information about HMMs the reader is invited to consult "An Introduction to Hidden Markov Models", L. R. Rabiner and B. H. Juang, IEEE ASSP Magazine, January 1986, pp.4–16 whose content is hereby incorporated by reference.

For the purpose of this specification the expression "allophone" is used to designate the pronunciation of a phoneme placed in a certain context defined by the surrounding phones. For more information regarding allophonic contexts the reader is invited to consult U.S. Pat. No. 5,195,167 "Apparatus and method of grouping utterances of a phoneme into context-dependent categories based on sound similarity for automatic speech recognition", L. R. Bahl et al., Apr. 17, 1992. The content of this document is hereby incorporated by reference.

The methods presented in this specification allow the modification of the speech recognition dictionary of a speech recognition system in order to adapt the system to the word pronunciation of the user population or to variations in the pronunciation of a user of the system.

In a specific example, the invention is embodied in a transcription adapting apparatus that is associated with a speech recognition system. Preferably, such a system generally comprises a number of functional modules namely a speech source, a speech recognizer and a transcription adapter module. The speech source may be a device such as a microphone or telephone set that converts a spoken utterance into an electric signal. In another preferred embodiment the speech source is a computer readable storage medium containing data elements representative of speech utterances. In a specific example, spoken utterances are digitised and stored on a non-volatile storage medium such as a hard disk. In another specific example, spoken utterances are stored on a magnetic tape. The speech recognition system also includes a computer readable storage medium on which is stored an action table and a speech recognition dictionary. The transcription adapter module interacts with the speech recognition dictionary to modify the latter's contents. Optionally, the speech recognition system features rejection capabilities.

In a typical interaction, the speech recognition system receives as input a signal representative of the audio information produced when uttering a certain word. The speech recognizer receives the signal, processes it, scores entries in the speech recognition dictionary and outputs the most likely candidate. The recognition candidate is preferably in the form of an orthography.

Optionally, following the recognition step, a controller unit performs a verification operation in order to eliminate candidates unlikely to match the spoken utterance. In this regard, the controller unit may apply a rejection algorithm such as that described in U.S. Pat. No. 5,097,509 Lennig "Rejection Method for Speech Recognition", Mar. 17, 1992 whose content is hereby incorporated by reference. If the recognition is successful, the recognized orthography is used to access an entry in an action table. Preferably, the speech token and the recognized orthography are also stored on a computer readable storage medium in the labeled speech storage unit to await further processing.

Once the speech recognition system is taken offline, the transcription adaptation module is invoked. Alternatively, the transcription adaptation module is invoked after each speech recognition request and its operations are performed on-line. For transcription adaptation modules operating on-line the labeled speech storage unit may be omitted from the system. The transcription adaptation module processes each speech token and orthography. In a first step, for each speech token in the labeled speech storage unit, the selection module locates the corresponding orthographic group and scores all the transcriptions in the group. Once the speech tokens associated with a given orthographic group have been processed, compound scores are computed for each transcription by combining the individual scores obtained from each speech token. Following this, the transcription in a given orthographic groups are sorted on the basis of their compound score and the top N transcriptions are selected to replace the transcriptions in the speech recognition dictionary associated with the same orthography. Alternatively, the N transcriptions selected are stored in the speech recognition dictionary in addition to the original transcriptions.

In a preferred embodiment of the invention, the speech recognition system comprises a transcription adaptation module. The adaptation module uses the recognized orthography received by the controller unit along with the speech token in order to modify the speech recognition dictionary. In a preferred embodiment of the invention the transcription adaptation module comprises a transcriptions bank and a selection module. Optionally, the transcription adaptation module may comprise an augmentor module and a labeled speech storage unit.

In a preferred embodiment, the adaptation module comprises a computer readable storage medium containing a repository of transcriptions, herein designated as the transcriptions bank. The transcriptions bank contains a plurality of transcriptions for each of the orthographies in the speech recognition dictionary. The transcriptions bank may be created by using a text to transcription module using information derived from text to phoneme rules. In a most preferred embodiment, text to phoneme rules from many languages are used to include the variations in pronunciations across languages. In another preferred embodiment, the transcriptions in the transcriptions bank are derived from letter to phoneme rules as well as from language dictionaries. The system to generate the transcriptions bank further comprises a language dictionary transcription module and a computer readable storage medium containing a language dictionary. In a most preferred embodiment, language dictionaries from many languages are used to include the variations in pronunciations across languages. Using transcriptions from several languages admits pronunciation variants that are phonetically illegal in a given language but are valid in another language. Transcriptions in the transcriptions bank may be organized any suitable fashion without detracting from the spirit of the invention.

In a preferred embodiment, the adaptation module comprises a computer readable storage medium containing labeled speech elements. The adaptation of the dictionary is then performed off-line in batch mode. Preferably, a large number of speech tokens are used for adaptation. In a specific example, the number of speech tokens exceeds 20 tokens for each orthography. Alternatively, adaptation may be performed on-line after each recognition result as a speech recognizer post-process. For on-line processing, the labeled speech storage unit may be omitted from the adaptation module. On-line processing typically causes an increase in the computational requirements of the system by allowing the dictionary to be updated for the next time the system is used. The use of batch mode or on-line mode does not detract from the spirit of the invention.

The transcription adaptation apparatus preferably includes a selection module that selects from the transcriptions bank a set of transcriptions to be included in the speech recognition dictionary. The selection module receives labeled speech from the labeled speech storage unit. Alternatively, if the transcription adaptation occurs on-line the selection module may receive labeled speech items from the speech recognizer or from the controller unit. In a typical interaction, the selection module locates in the transcriptions bank the orthographic group associated with the labeled speech item. Following this, the speech token of the labeled speech item is aligned with the transcriptions within the orthographic group. Each transcription in the orthographic group is then scored. Many methods of assigning scores to transcriptions may be used here without detracting from the spirit of the invention. In a preferred embodiment, for each speech token in the labeled speech storage unit associated with the same orthography a score is obtained. The scores for each speech token are then combined in order to obtain a compound score. Following this, the transcriptions are sorted on the basis of these scores and the top scoring transcriptions are selected. In a preferred embodiment, the selection module outputs the top N scoring transcriptions. In another preferred embodiment, the selection module outputs transcriptions with scores above a given threshold. The N top scoring transcriptions of the word are introduced in the speech recognition dictionary and associated with a label corresponding the new word being added. In a preferred embodiment, the label is the orthographic representation of the word.

In a preferred embodiment of the invention the transcription adaptation apparatus further comprises an augmentor unit. The augmentor unit receives labeled speech, comprising the speech token and the orthography, from the labeled speech storage unit, from the controller or from the speech recognizer. The output of the augmentor module is a transcription corresponding to the speech token. The augmentor unit may make use of a continuous allophone recognizer to generate the transcription. The automatic transcription of utterances is well known in the art to which this invention pertains. Many algorithms may be used here without detracting from the spirit of the invention. The reader is invited to consult: R. Haeb-Umbach, P. Beyerlein and E. Thelen, "Automatic Transcription of Unknown Words in a Speech Recognition System", Proc. of the IEEE Inter. Conf. On ASSP, 1995, pp. 840–843; J. Duchateau and D. V. Compernolle, "Automatic Modeling of User specific Words for a Speaker-Independent Recognition System", Proc. Of the IEEE Inter. Conf. On ASSP, 1996, pp. 869–872. N. Jain, R. Cole, E. Barnard, "Creating Speaker-Specific Phonetic Templates with A Speaker-Independent Phonetic Recognizer; Implications for Voice Dialing" Proc. Of the IEEE Inter. Conf. On ASSP, 1996, pp. 881–884 and T. Holter and T. Svendsen, "Maximum Likelihood Modeling of Pronunciation Variation", Proc. Of ESCA Workshop on Modeling Pronunciation Variation for ASR, 1998, pp. 63–66. The transcription generated by the augmentor unit is then compared to transcriptions already in the transcriptions bank in the appropriate orthographic group. If the transcription is not within the orthographic group it is added to the transcriptions bank.

In another embodiment, the speech recognition dictionary created by the above method and apparatus is speaker specific. In this case the utterances are collected from the end user of the system and only 2 or three utterances would be required to supply sufficient precision. Optionally, for a user specific dictionary, the training may take place on-line immediately after the utterances are received from the user since there is no need to gather utterances from a plurality of sources. The dictionary would be updated for the next time it is used.

As embodied and broadly described herein the invention further provides a method for generating a transcription capable of being used to create an entry in a speech recognition dictionary for a certain word, said method comprising the steps of:
  providing a computer readable storage medium containing a transcriptions bank, said transcriptions bank comprising a plurality of orthographic groups, each orthographic group including a plurality of transcriptions associated with a common word;
  receiving:
    a) a signal representative of audio information produced when uttering a certain word;
    b) a label element associated with said signal;
  retrieving on a basis of said label element the orthographic group corresponding to the certain word;
  processing said signal to select a certain transcription from said orthographic group corresponding to the certain word;
  delivering the certain transcription capable of being used for creating an entry in the speech recognition dictionary.

As embodied and broadly described herein the invention yet provides a computer readable storage medium containing a program element to direct a computer to generate a transcription capable of being used to create an entry in a speech recognition dictionary for a certain word, said computer including:
  memory means including:
    a) a transcriptions bank, said transcriptions bank comprising a plurality of orthographic groups, each orthographic group including a plurality of transcriptions associated with a common word,
  processor means in operative relationship with said memory means, said program element instructing said processor means to implement functional blocks for:
    a) receiving:
      1) a signal representative of audio information produced when uttering a certain word;
      2) a label element associated with said signal;
    b) retrieving on a basis of said label element the orthographic group in the transcriptions bank corresponding to the certain word;
    c) processing said signal to select a certain transcription from said orthographic group corresponding to the certain word;
    d) outputting a signal representative of the certain transcription, the signal representative of the certain transcription capable of being used for creating an entry in the speech recognition dictionary.

As embodied and broadly described herein the invention also provides an adaptive speech recognition system, said system comprising:
  a first input for receiving audio information representative of an utterance of a certain word;
  a speech recognition dictionary comprising a plurality of vocabulary items potentially recognizable on a basis of a spoken utterance;
  a speech recognition unit for selecting on a basis of the audio information representative of an utterance of the certain word a vocabulary item as being a match to the utterance of the certain word;
  an adaptation module, including:
    a) a transcriptions bank, said transcriptions bank comprising a plurality of orthographic groups, each orthographic group including a plurality of transcriptions associated with a common word,
    b) a second input coupled to said speech recognition unit for receiving:
      1) the signal representative of audio information produced when uttering the certain word;
      2) the vocabulary item selected by said speech recognition unit as being a potential match to the utterance of the certain word;
    c) a transcription selector module for:
      1) retrieving on a basis of said vocabulary item at said second input the orthographic group corresponding to the certain word;

2) processing the signal representative of audio information produced when uttering the certain word to select a certain transcription from the orthographic group corresponding to the certain word;

3) replacing in said speech recognition dictionary the vocabulary item selected as being a match to the utterance of the certain word by a new vocabulary item generated on a basis of the transcription selected from the orthographic group corresponding to the certain word.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention for which reference should be made to the appending claims.

DESCRIPTION OF A PREFERRED EMBODIMENT

Figure 1:
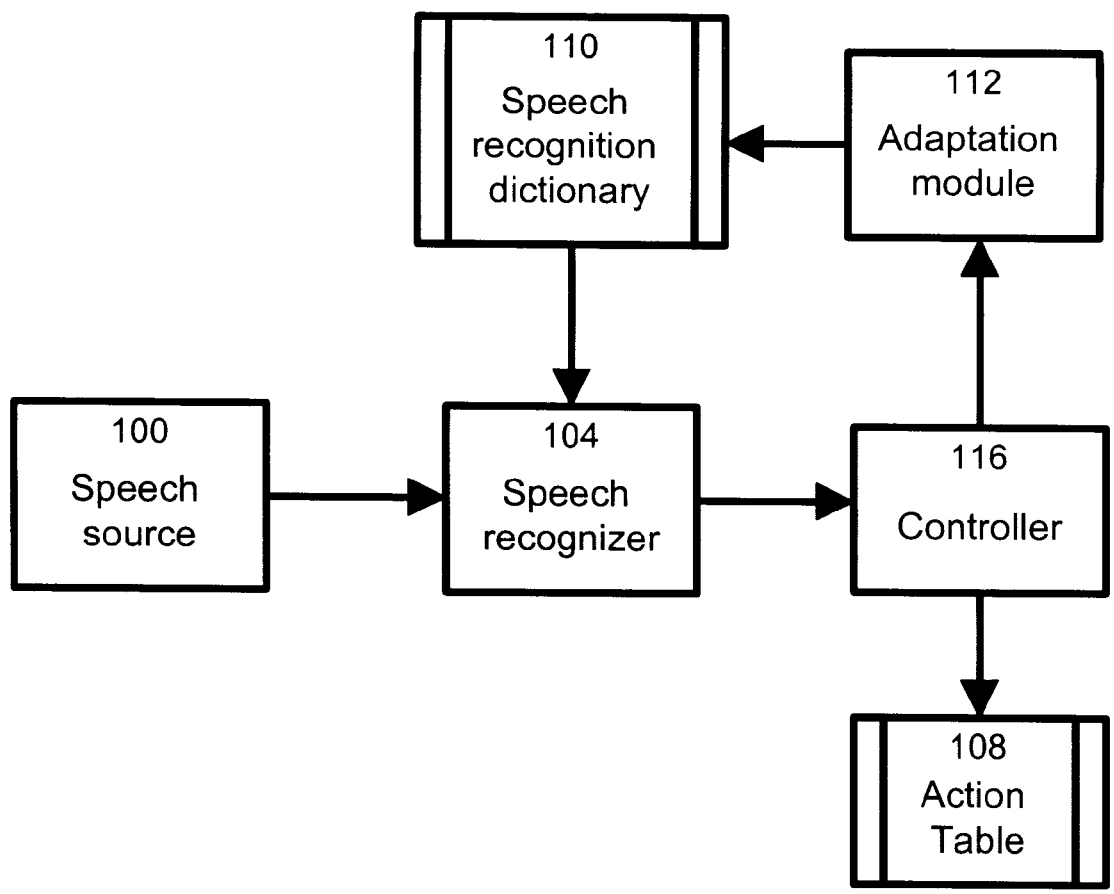
FIG. 1 shows a simplified functional block diagram of a speech recognition system in accordance with the invention.

In a most preferred embodiment of the invention, the transcription adapting apparatus is integrated into a speech recognition system with adaptation capabilities offering transcription adaptation. As shown in FIG. 1, such a system generally comprises a number of functional modules namely a speech source 100, a speech recognizer 104 and a transcription adapter module 112. The speech recognition system with adaptation capabilities also includes a computer readable storage medium comprising an action table 108 and a speech recognition dictionary 110. The transcription adapter module 112 interacts with the speech recognition dictionary 110 to modify the latter's contents. Optionally, the speech recognition system may comprise a controller unit 116 in order to provide the system with rejection capabilities.

In a preferred embodiment, the speech source unit 100 may be a device such as a microphone or telephone set that converts a spoken utterance into an electric signal. In another preferred embodiment the speech source is a computer readable storage medium containing data elements representative of speech utterances. In a specific example, spoken utterances are digitised and stored on a non-volatile storage medium such as a hard-disk. In another specific example, spoken utterances are stored on a magnetic tape. The speech source 100 processes utterances comprising speech and non-speech events. Speech events, herein referred to as speech tokens, may correspond to entries in the recognition vocabulary or may correspond to entries outside the recognition vocabulary (imposter speech). In a specific example, speech tokens are derived from user utterances in a corporate voice activated dialing system. The recognition vocabulary comprises the names of the employees of the corporation and typical speech tokens comprise the utterances of employee names. In such a situation, speech outside the recognition vocabulary may be due to poor task specification such as unpredicted synonyms or nicknames, or may be due to out of domain utterance. For example, if the name "Mike Fox" is in the recognition vocabulary and the speaker requests "Michael Fox", then the speech is outside of the recognition vocabulary even though it is a synonym for a valid item. As another example, if a speaker requests "What is the present time" in a Name Dialing system, the speech event is considered outside the recognition vocabulary. Non speech events comprise extraneous noise, silences and others. In a preferred embodiment, the speech source comprises speech tokens originating from a captive population such that substantially the same individuals use the application. In a specific example, a corporate name dialing system may be considered as having a captive user population if only employees of the corporation have access to the system. In another preferred embodiment, the speech source may comprise speech token originating from a slowly varying population. In a specific example, a corporate name dialing system may be considered as having a slowly varying user population due to transfers, promotions, retirements and other events which may alter the composition of the users. In yet another preferred embodiment, the user population may be substantially open ended such that most anyone may have access to the system such as in a directory assistance system. In yet another preferred embodiment, the speech comprises speech tokens from a single user, as may be the case in speaker dependent speech recognition system.

In a preferred embodiment, the speech recognition system with adaptation capabilities comprises a speech recognition dictionary stored on a machine-readable storage medium. The speech recognition dictionary 110 stores a set of vocabulary items potentially recognizable on the basis of a spoken utterance. Typically, a speech recognition dictionary 110 comprises entries such as orthographies and transcriptions. The transcriptions in the dictionary represent data elements that are a combination of symbols providing information on how a sub-word unit, such as a letter or a combination of letters, may be pronounced. The speech recognition unit 104 tries to match the detected speech signal with entries in the speech recognition dictionary 110 and selects the entry that is the most likely to be what the user is saying. Initially the speech recognition dictionary 110 may be created by a dictionary initialization module on the basis of entries in the recognition vocabulary. The recognition vocabulary typically comprises the words the speech recognition module should recognize. The speech recognition dictionary created on the basis of recognition vocabulary may be speaker dependent or independent without detracting from the spirit of the invention. In speech recognition applications, speech is generally used to invoke an action within the application. Preferably, each transcription in the speech recognition dictionary is associated to a label that can be an orthography. In a preferred embodiment, each label in the speech recognition dictionary is in turn associated to a link allowing the desired action associated to the label to be completed upon selection of a transcription associated to the label by a speech recognition system. In the example of a voice activated dialing system, the link may be a pointer to a data structure containing the telephone number of the entity associated with the label. The system then outputs the telephone number that can be automatically dialed. The link may also be an action link that identifies an action to be taken. For example in a system designed to effect a certain procedure in response to a spoken command, the link designates the action to be performed. This designation may be direct in which case the link contains the information identifying the action, or indirect where the link points to a location containing the information identifying the action. In a specific example, the speech recognition system may be used to operate components on the basis of spoken commands. For instance the user may say "lights on" to indicate that the lighting in a room is to be activated. The action link in this case identifies the specific action to be taken. The link may be a data element that contains the information to the effect that the lights should be activated or it may be a pointer to a table containing the entire list of possible actions that the system can effect, the pointer identifying the entry in the table corresponding to the light activation. Thus, for the purposes of this specification, the expression "link" should be interpreted in a broad manner to designate the structure that constitutes an operative relationship between a label and the desired action that is to be performed when a transcription associated with the label is selected by the speech recognition system as a likely match to the spoken utterance.

Alternatively, the speech processing system may include an action table 108 establishing a relation between a label and an action to be taken. The speech recognizer 104 releases the selected entry to the action table that locates the appropriate action.

In a preferred embodiment, the speech recognizer 104 receives from the speech source 100 a speech signal. Typically, the speech signal is processed by a sequence of steps performed by the speech recognizer 104. In a specific example, a pre-processing unit in the speech recognizer 104 converts the signal representative of the utterance into a sequence of feature vectors or other suitable representation. For example mel-based cepstral parameters may be used to compose the feature vectors. Feature vectors are well known in the art to which this invention pertains. A search unit implementing a search algorithm then processes the feature vectors. The search unit scores entries in the speech recognition dictionary 110 and selects potential matches to the spoken utterance, herein referred to as recognition candidates. Any suitable search algorithm may be used here without detracting from the spirit of the invention. In a specific example, the search unit implements the two-pass search algorithm described in U.S. Pat. No. 5,515,475 Gupta et al. "Speech Recognition method using a two-pass search", May 7, 1996 whose content is hereby incorporated by reference. The operation of the speech recogniser 104 is well known in the art to which this invention pertains. For more information about speech recognisers units, the reader is invited to consult the following patents and articles whose contents are hereby incorporated by reference.

| U.S. PATENTS | |
| --- | --- |
| U.S. Pat. No. | INVENTOR |
| 5,488,652 | Gregory, J. Bielby et al. |
| 4,164,025 | Dubnowski et al. |
| 4,751,737 | Gerson et al. |
| 4,797,910 | Daudelin |
| 4,959,855 | Daudelin |
| 4,979,206 | Padden et al. |
| 5,050,215 | Nishimura |

| -continued | |
| --- | --- |
| U.S. PATENTS | |
| U.S. Pat. No. | INVENTOR |
| 5,052,038 | Shepard |
| 5,091,947 | Ariyoshi et al. |
| 5,097,509 | Lennig |
| 5,127,055 | Larkey |
| 5,163,083 | Dowden et al. |
| 5,181,237 | Dowden |
| 5,204,894 | Darden |
| 5,274,695 | Green |
| 5,307,444 | Tsuboka |
| 5,086,479 | Takenaga et al. |

| OTHER ART | | |
| --- | --- | --- |
| TITLE | AUTHOR | SOURCE |
| Dynamic Adaptation of Hidden Markov Model for Robust Speech Recognition | | 1989, IEEE International Symposium on Circuits and Systems, vol. 2, May 1989 pp. 1336–1339 |
| Unleashing The Potential of Human-To-Machine Communication | Labov and Lennig, | Telesis, Issue 97, 1993, pp. 23–27 |
| An introduction To Hidden Markov Models | Rabiner and Juang | IEEE ASSP Magazine, Jan. 1986, pp. 4–16 |
| Putting Speech Recognition to Work in The Telephone Network | Lennig, | Computer, published by IEEE Computer Society, vol. 23, No. 8, Aug. 1990 |

In a preferred embodiment, the controller module 116 receives the candidate recognition results from the speech recognizer 104 and assigns a confidence measure to them. The controller's 116 purpose is to reject candidates that are less likely to be correct. It may make use of external cues such as call completion information, human correction information and others. Optionally, the controller module 116 may detect the presence of known decoys, also known as imposters, depending on the nature of the application. If the confidence measure indicates that the top candidate is not satisfactory, the recognition result is refused and a rejection handler may be invoked. If the controller was able to detect the presence of decoys and that the top candidate was a decoy, an imposter handler may be invoked. If the confidence metric assigned to the top candidate indicates that the top candidate is satisfactory, the top candidate is used to identify the appropriate action in the action table 108. The top candidate is also forwarded to an adaptation module 112.

Figure 2:
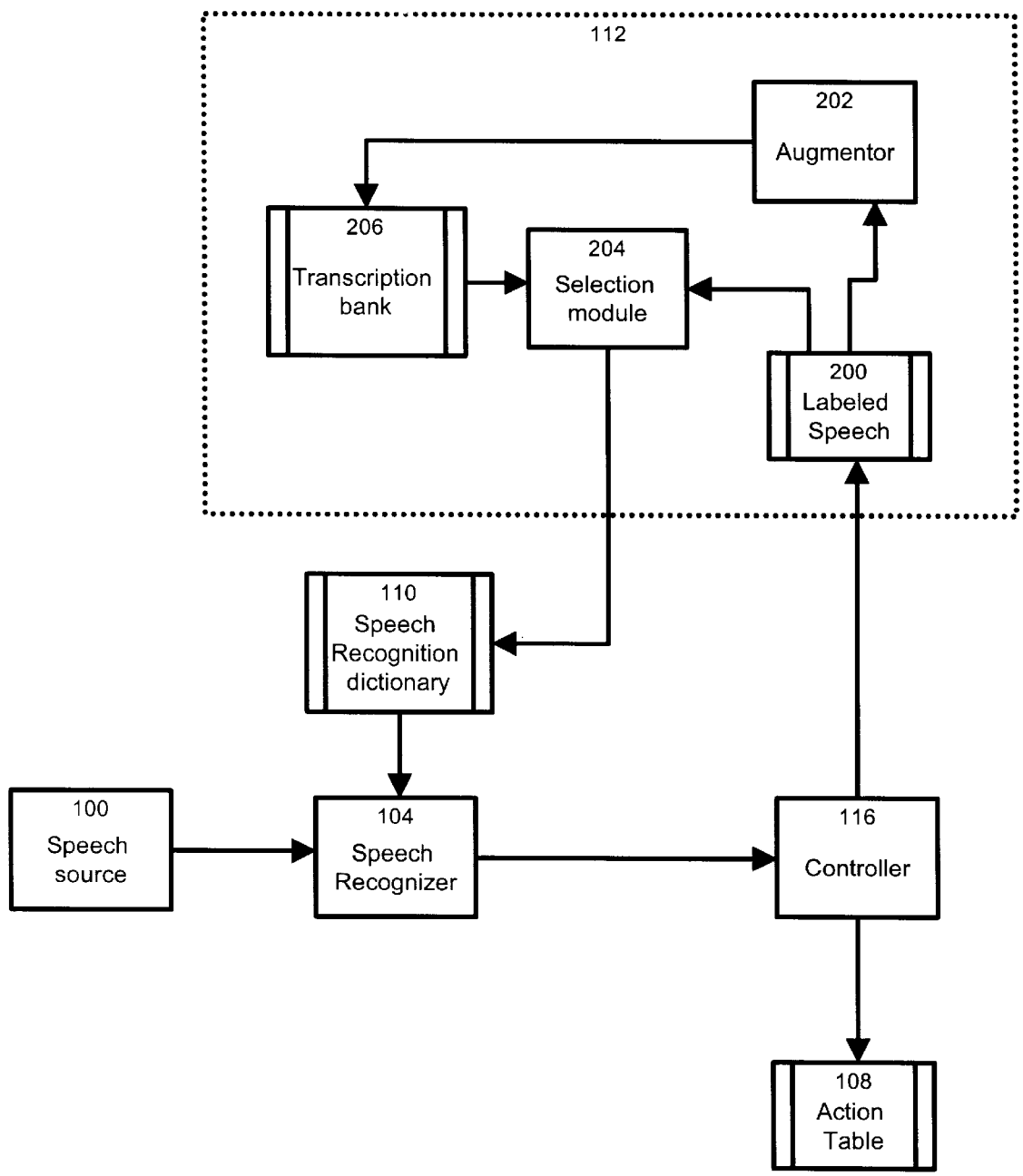
FIG. 2 shows a block diagram of a speech recognition system with a detailed view of an embodiment of the transcription adaptation module.

The transcription adaptation module 112 uses the recognized orthography received by the controller unit 116 along with the speech token in order to modify the speech recognition dictionary. In a preferred embodiment of the invention, as shown in FIG. 2, the transcription adaptation module comprises a transcriptions bank 206 and a selection module 204. Optionally, the transcription adaptation module 112 may comprise an augmentor module 202 and a labeled speech storage unit 200.

In a preferred embodiment, the adaptation module 112 comprises a computer readable storage medium containing a repository of transcriptions 206, herein designated as transcriptions bank. The transcriptions bank 206 contains a plurality of transcriptions for each of the orthographies in a recognition vocabulary, herein designated as a lexicon.

Figure 3A:
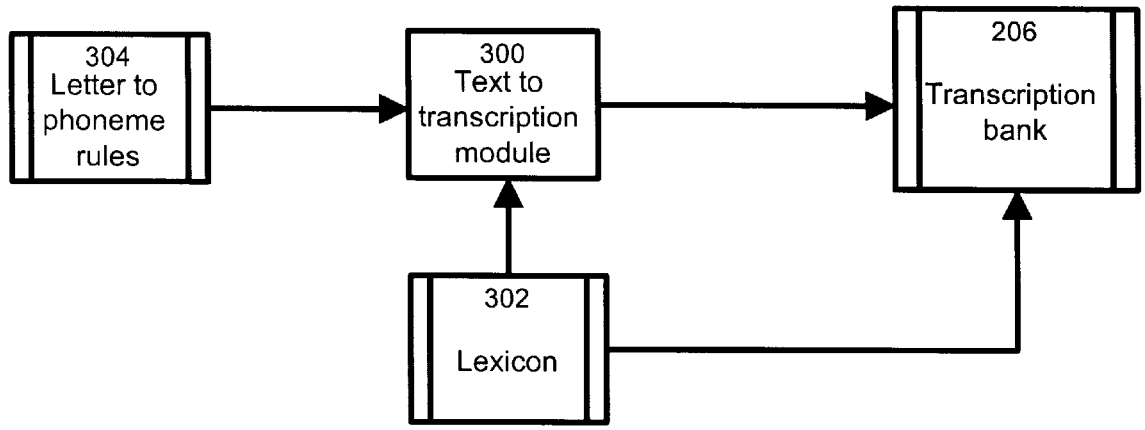
FIG. 3a and FIG. 3b show embodiments of the transcriptions bank creation unit.
Figure 3B:
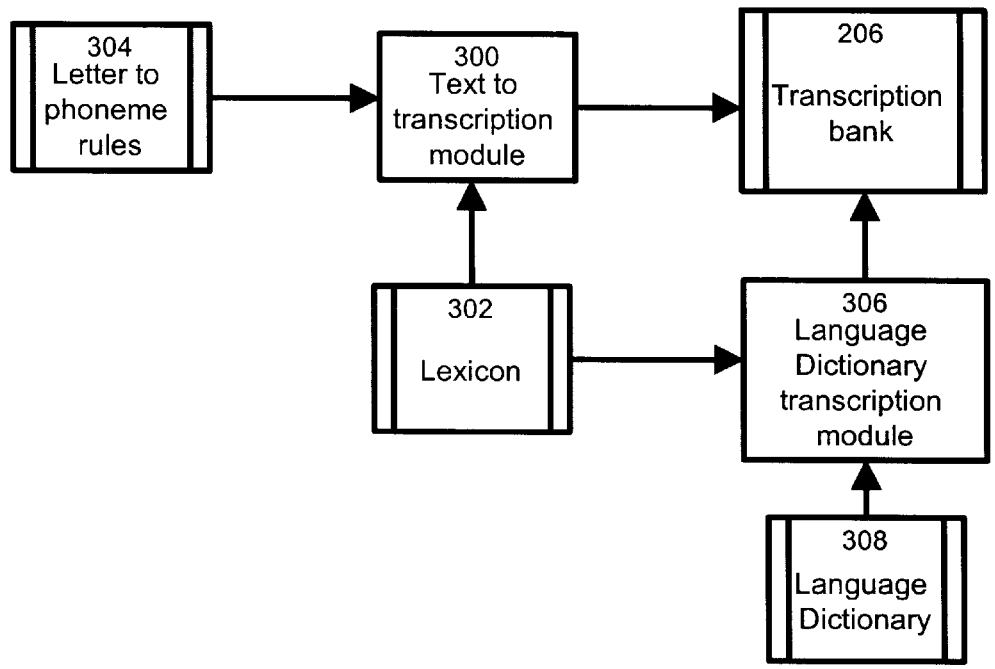

Optionally, the transcriptions bank may further comprise weight values associated to each transcription in the transcriptions bank, the weight values being indicative of an a priori probability for the transcription. Initially, all automatically generated transcriptions may be assigned a default probability value. As shown in FIG. 3b, the transcriptions bank 206 is created by using a text to transcription module 300 to process entries in a lexicon 302 in order to obtain a plurality of transcriptions using information derived from text to phoneme rules 304. The transcriptions generated by the text to transcription module 300 are then stored on a computer readable storage medium containing the transcriptions bank 206. The lexicon 302 contains entries for the words the speech recognition system should be able to recognize. As a specific example of a corporate name dialing system, the task lexicon contains an entry for the name of each employee. In a preferred embodiment, the entries in the lexicon are orthographies. The letter to phoneme generator 300 is preferably an automatic letter to transcription generator requiring little or no human intervention. Preferably, the text to transcription generator 300 is configured such that it generates a large number of transcriptions. In a specific example, the text to transcription generator 300 generates 50 to 200 transcriptions per orthography. Variation in the number of transcriptions per orthography does not detract from the spirit of the invention. There are many types of letter to phoneme transcription methods that may be used here such as described in "Modeling Pronunciation Variation for ASR: Overview and Comparison of methods", Helmer Strik and Catia Cucchiarini, Workshop Modeling Pronunciation Variation, Rolduc, 4–6 May 1998, "Maximum Likelihood Modelling of Pronunciation Variation", Trym Holter and Torbjorn Svendsen, Workshop Modeling Pronunciation Variation, Rolduc, 4–6 May 1998, pp.63–66 and Automatic Rule-Based Generation of Word Pronunciation Networks, Nick Cremelie and Jean-Pierre Martens, ISSM 1018–4074, pp.2459–2462, 1997 whose contents are hereby incorporated by reference. In a most preferred embodiment, text to phoneme rules 304 from many languages are used to include the variations in pronunciations across languages. In a specific example, for a voice dialing system in North America, three sets of letter to phoneme rules are used for three of the widely spoken languages namely French, English and Spanish. In another preferred embodiment, the transcriptions in the transcriptions bank 206 bank are derived from letter to phoneme rules as well as from language dictionaries. As shown in FIG. 3b, the system to generate the transcriptions bank further comprises a language dictionary transcription module 306 and a computer readable storage medium containing a language dictionary 308. The language dictionary provides transcriptions reflecting the correct pronunciation of words in the lexicon 302. The transcriptions resulting from the language dictionary transcription module 306 are then stored in the transcriptions bank 206. In a most preferred embodiment, language dictionaries 304 from many languages are used to include the variations in pronunciations across languages. In a specific example, for a voice dialing system in North America, three language dictionaries are used for three of the widely spoken languages namely French, English and Spanish. Using transcriptions from several languages admits pronunciation variants that are phonetically illegal in a given language but are valid in another language. In a preferred embodiment, the language dictionary transcription module 306 looks up the entry corresponding to each orthography in the lexicon in the language dictionary in order to generate a transcription to add to the transcriptions bank 206. The table below illustrates the different transcriptions that many be generated from the language dictionaries and the letter to phoneme rules for the orthographies "Brault", "Jose" and "George" in the lexicon.

| Lexicon (orthography) | English Dictionary | French Dictionary | English letter to phoneme rules | French letter to phoneme rules |
|---|---|---|---|---|
| Brault | Bro<br>BrOlt | bro | bro<br>brawlt | bro<br>brOlt<br>bra-ylt |
| Jose | ho-ze | Zo-ze | dZo = s*<br>dZoz<br>dZo = z* | Zo-zE<br>Zoz |
| George | DZOrdZ | DZOrdZ | dZOrdZ<br>dZo-ordZ | ZOrZ<br>ZOr-Ze<br>dZOrZ |

An example of transcriptions bank entries for the orthography "Archimede" is shown in the table below. The set of transcriptions associated with a same orthography is herein referred to as an orthographic group. The expression "orthographic group" may also include the orthography associated with the transcriptions in the group.

| Orthography | Transcriptions | | |
|---|---|---|---|
| Archimede | Ark*mid | ArkImid | ArSimd |
| | Arkajmd | ArSImid | ArkimEde |
| | ArtSImid | ArkimEde | ArSimEd |
| | Arkjmid | artS*mid | Arkimd |
| | Ark*mid | ArkimEdi | ArkimEd |
| | ArtS*mid | arkajmid | ArSimEdE |
| | ArkImid | ArtSajmid | ArSimed |
| | ArtSajmd | ArtSImid | ArkimEdE |

Transcriptions in the transcriptions bank may be organized any suitable fashion without detracting from the spirit of the invention. In a preferred embodiment, the transcriptions bank is organized in the form of a table with transcriptions belonging to the same orthographic group stored in logical proximity. In another preferred embodiment, transcriptions belonging to the same orthographic group are stored in a graph. Graphs are well known in the art to which this invention pertains. For more information about graphs the reader is invited to consult V. N. Gupta et al. "Fast search strategy in a large vocabulary word recognizer", JASA 84(6), pp.2007–2017, Dec. 1988 whose content is hereby incorporated by reference.

In a preferred embodiment, the adaptation module 112 comprises a computer readable storage medium containing labeled speech data 200. The utterances are tokenized by the speech source 100 and associated with an orthography in the speech recognition dictionary 110 by the speech recognizer 104. The speech tokens and their associated orthographies are then placed in the labeled speech storage unit 200. The labeled speech storage unit 200 may be stored on a computer readable storage medium such as a hard drive or other non-volatile storage medium. The stored tokens may be arranged in the speech storage unit using any suitable data structure. In a specific example, the labeled speech storage unit is organized as a table. Preferably, speech tokens associated with the same orthography are stored such that they are in logical proximity. This may be achieved by storing the speech tokens associated with the same orthography in adjacent memory locations or by using a data structure such as a linked list in order to provide such a logical proximity. The adaptation of the dictionary 110 is then performed off-line in batch mode. Preferably, a large number of speech tokens are used for adaptation. In a specific example, the number of speech tokens exceeds 20 tokens for each orthography. Alternatively, adaptation may be performed on-line after each recognition result as a speech recognition post-process. For on-line processing, the labeled speech storage unit 200 may be omitted from the adaptation module 112 and the speech tokens and orthography sent directly to the processing modules 204 and 202. On-line processing typically causes an increase in the computational requirements of the system but allows the dictionary to be updated for the next time the system is used. The use of batch mode or on-line mode does not detract from the spirit of the invention.

In a preferred embodiment of this invention, the transcription adaptation apparatus includes a selection module 204 that selects from the transcriptions bank 206 a set of transcriptions to be included in the speech recognition dictionary 110. The selection module 204 receives labeled speech from the labeled speech storage unit 200. Alternatively, if the transcription adaptation occurs on-line the selection module 204 may receive labeled speech items from the speech recognizer 104 or from the controller unit 116. In a specific example, a labeled speech item comprises a speech token and the orthography most likely to correspond to the speech token.

Figure 4:
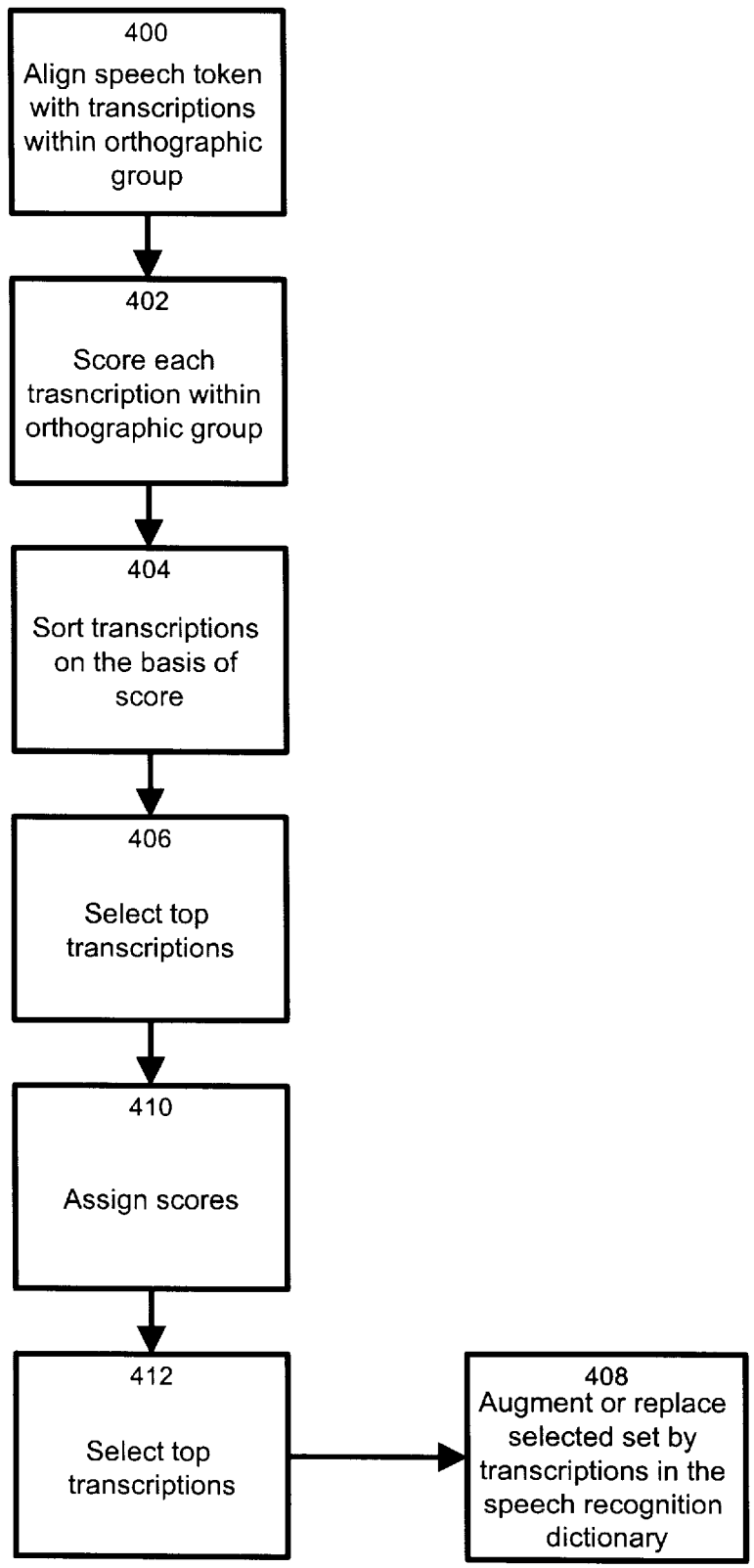
FIG. 4 shows a flow chart of a method in accordance with the invention for augmenting or replacing a selected set of transcriptions from the transcriptions bank.

In a typical interaction, as shown in FIG. 4, the selection module 204 locates in the transcriptions bank 206 the orthographic group associated with the labeled speech item. Following this, the speech token of the labeled speech item is aligned 400 with the transcriptions within the orthographic group. Each transcription in the orthographic group is then scored 402. Many methods of assigning scores to transcriptions may be used here without detracting from the spirit of the invention. In a specific example, the Viterbi alignment score is used. The Viterbi algorithm is well known in the art to which this invention pertains. In a preferred embodiment, for each speech token in the labeled speech storage unit associated with the same orthography a score is obtained. The scores for each speech token are then combined in order to obtain a compound score.

In a specific example, the transcriptions in the transcriptions bank are arranged in the form of a graph where each branch is associated to a phoneme or allophone. For each speech token, a graph search algorithm is used to score the graph. For more information about a graph search, the reader is invited to consult V. N. Gupta et al. "Fast search strategy in a large vocabulary word recognizer", JASA 84(6), pp.2007–2017, Dec. 1988 whose content is herein incorporated by reference. Using the methods presented in the above document, each branch in the graph is assigned a branch log likelihood score for each speech token. Once a branch in the graph has been assigned a score for each speech token, a compound score for each branch is computed by combining the score for each individual speech token. The log likelihood scores associated to a branch are summed to create the compound score for the branch. For example, the branch $B^{nm}_k$, where k is the index of the branch, in the transition from state $S_n$ to $S_m$ has log likelihood scores $P^{k,nm}_1$, $P^{k,nm}_2$ and $P^{k,nm}_3$ for utterances $U_1$, $U_2$ and $U_3$ respectively. The compound log likelihood score for the branch $B^{nm}_k$ is $P^{k,nm}_1 + P^{k,nm}_2 + P^{k,nm}_3$.

Following this, the transcriptions are sorted 404 on the basis of these scores and the top scoring transcriptions are selected 406. In a preferred embodiment, the selection module outputs the top N scoring transcriptions. In another preferred embodiment, the selection module outputs transcriptions with scores above a given threshold.

Optionally, following this, the top transcriptions are assigned weight values 410. In a preferred embodiment, the rank order method is used to assign weight values to the transcriptions. The rank order method can be used to score the transcriptions. The rank order method assigns a weight value based on the rank of the transcription choice. In a specific example, the top N transcriptions are considered. The top weight is assigned a weight value of 1.0 and the Nth choice is assigned a weight value of 1.0/N. The intermediate weight values are linearly decreasing such that the Kth choice is assigned a weight value of 1.0-K/N. The table below shows the calculated rank order values:

| Choice | Weight |
| --- | --- |
| 1 | 1 |
| 2 | 1–1/N |
| 3 | 1–2/N |
| — | |
| K | 1–(K-1)/N |
| — | |
| N | 1/N |

Other mechanisms may be used to assign weight values to the intermediate results without detracting from the spirit of the invention. In another preferred embodiment, the score ratio method is used to assign weight values to the transcriptions. The score ratio method assigns a weight value to a transcription on the basis of the ratio of top choice Viterbi alignment score to the weight of the Kth choice. Using this method, the weight value of the top transcription is 1.0 and the weight value the Kth transcription is [Viterbi (1)/Viterbi (K)]. Other suitable methods of assigning weight values to the top scoring transcriptions may be used here without detracting from the spirit of the invention.

Following this, the transcriptions with the top weight values are selected to augment or replace the transcriptions in the speech recognition dictionary. Alternatively, the transcriptions with the top weight values are added to the original transcriptions in the speech recognition dictionary 408. The combined set of top scoring transcriptions and original dictionary transcriptions constitutes the new speech recognition dictionary entry. Optionally, the weight values are used to maintain statistics in the transcriptions bank. As previous mentioned, optionally, to each transcription in the transcriptions bank is associated an a priori weight value. The weight values computed by the above-described method may be added on to the weight value in the transcriptions bank or may replace the weight values.

In a preferred embodiment of the invention the transcription adaptation apparatus comprises an augmentor unit 202. The augmentor unit 202 receives labeled speech, comprising the speech token and the orthography, from the labeled speech storage unit 200, from the controller 116 or from the speech recognizer 104. The output of the augmentor module 202 is a transcription corresponding to the speech token. The augmentor unit 202 may make use of a continuous allophone recognizer to generate the transcription. Automatic transcription of utterance is well known in the art to which this invention pertains. Many algorithms may be used here without detracting from the spirit of the invention. The reader is invited to consult: R. Haeb-Umbach, P. Beyerlein and E. Thelen, Automatic Modeling of User Specific Words in a Speech Recognition System, Proc. Of the IEEE Inter. Conf. On ASSP, 1995, pp. 840–843. J. Duchateau and D. V. Compernolle, Automatic Modeling of User specific Words for a Speaker-Independent Recognition System, Proc. Of the IEEE Inter. Conf. On ASSP, 1996, pp. 869–872. N. Jain, R. Cole, E. Barnard, Creating Speaker-Specific Phonetic Templates with A Speaker-Independent Phonetic Recognizer; Implications for Voice Dialing. Proc. Of the IEEE Inter. Conf. On ASSP, 1996, pp. 881–884. T. Holter and T. Svendsen, Maximum Likelihood Modeling of Pronunciation Variation, Proc. Of ESCA Workshop on Modeling Pronunciation Variation for ASR, 1998, pp. 63–66. The transcription generated by the augmentor unit is then compared to transcriptions already in the transcriptions bank 206 in the appropriate orthographic group. If the transcription is not within the orthographic group it is added to the transcriptions bank.

Figure 5:
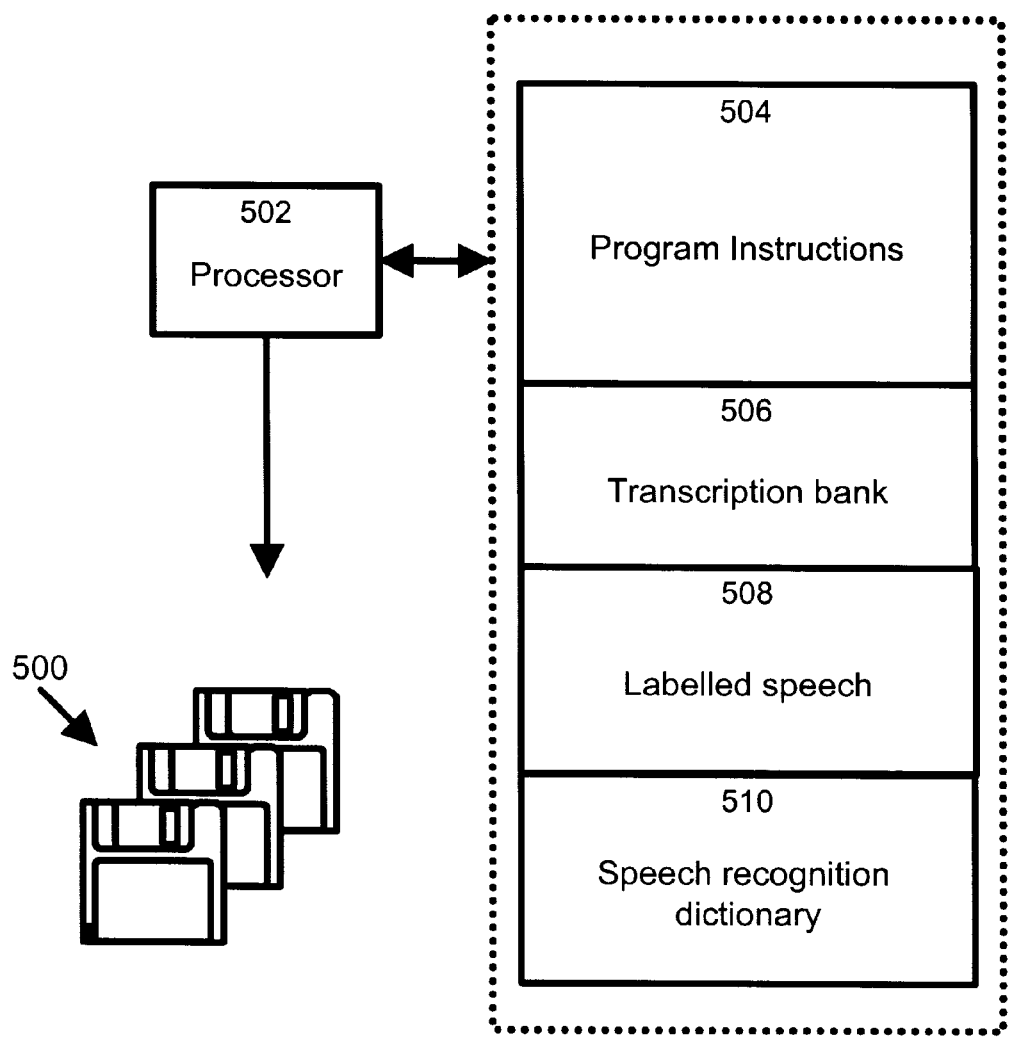
FIG. 5 is a block diagram of an apparatus for performing the training of the speech recognition dictionary in accordance with the invention.

The above-described method for adapting a speech recognition dictionary can be implemented on any suitable computing platform as shown in FIG. 5. Such computing platforms typically include a CPU 502 and a memory 500 connected to the CPU by a data communication bus. The memory 500 stores the data 506 508 510 and the instructions of the program 504 implementing the functional blocks depicted in the drawings and described in the specification. That program 504 operates on the data 506 508 in accordance with the algorithms described above to modify the speech recognition dictionary 510 based on a plurality of spoken utterances.

Although the present invention has been described in considerable detail with reference to certain preferred embodiments thereof, variations and refinements are possible without departing from the spirit of the invention as have been described throughout the document. The methods described above may also be applied to combination of words without detracting from the spirit of the invention. Therefore, the scope of the invention should be limited only by the appended claims and their equivalents.

I claim:

1. A method for adapting the transcription content of a speech recognition dictionary, the speech recognition dictionary including a plurality of dictionary transcription groups, each dictionary transcription group being associated to a respective word, said method comprising:
   a) providing a computer readable storage medium containing a transcriptions bank, said transcriptions bank comprising a plurality of orthographic groups, each orthographic group including a plurality of transcriptions associated with a common word, each orthographic group being associated with a respective label data element allowing to extract the orthographic group on the basis of the label data element, each orthographic group in the transcriptions bank corresponding to a respective dictionary transcription group;
   b) receiving a signal derived from a spoken utterance indicative of a certain word;
   c) receiving a label element from a speech recognizer processing said signal indicative of the certain word;
   d) retrieving from the transcriptions bank an orthographic group corresponding to the certain word on a basis of said label element;
   e) processing said signal to select a certain transcription from said orthographic group retrieved in d), said certain transcription being a most likely match to the spoken utterance conveyed by the signal;
   f) entering the certain transcription in a given dictionary transcription group, said given dictionary transcription group corresponding to the certain word selected from the speech recognition dictionary as being the most likely match to the spoken utterance conveyed by the signal received at the input.

2. A method as defined in claim 1, further comprising: processing the orthographic group corresponding to the certain word on the basis of the signal received at the input to select a set of transcriptions; inserting the set of transcriptions in the given dictionary transcription group.

3. A method as defined in claim 1, said method further comprising scoring the transcriptions in the orthographic group corresponding to the certain word to select the certain transcription.

4. A method as defined in claim 1, further comprising the step of augmenting said transcriptions bank in said computer readable medium on the basis of said signal derived from a spoken utterance indicative of a certain word.

5. A method as defined in claim 4, wherein said augmenting step includes the steps of:
   a) generating a transcription on the basis of said signal derived from a spoken utterance indicative of a certain word;
   b) adding the transcription generated in a) to the transcriptions bank in the orthographic group corresponding to the certain word.

6. An adaptive speech recognition system, said system comprising:
   an input for receiving a signal derived from a spoken utterance indicative of a certain vocabulary item;
   a speech recognition dictionary comprising a plurality of vocabulary items potentially recognizable on a basis of a spoken utterance, each vocabulary item being associated to a respective dictionary transcription group;
   a speech recognition unit in an operative relationship with said speech recognition dictionary, said speech recognition unit being operative for selecting on a basis of the signal received at the input a certain vocabulary item from said speech recognition dictionary as a likely snatch to the spoken utterance conveyed by signal received at the input;
   an adaptation module in operative relationship with said speech recognition dictionary, said adaptation module including:
   a) a transcriptions bank, said transcriptions bank comprising a plurality of orthographic groups, each orthographic group including a plurality of transcriptions associated with a common vocabulary item, each orthographic group in the transcriptions bank corresponding to a respective dictionary transcription group;
   b) a transcription selector module operative for:
     1) retrieving a given orthographic group from the transcriptions bank on a basis of the vocabulary item selected as being a likely match to the signal received at the input;
     2) processing the given orthographic group retrieved in 1) on the basis of the signal received at the input to select a certain transcription from the given orthographic group that is a most likely match to the spoken utterance conveyed by the signal at said input;
     3) entering in a dictionary transcription group corresponding to the vocabulary item selected as being a likely match to the spoken utterance conveyed by the signal received at the input the certain transcription selected in 2).

7. An adaptive speech recognition system as defined in claim 6, wherein said transcription selector module is operative for adding the certain transcription in the dictionary transcription group corresponding to the vocabulary item selected from the speech recognition dictionary as being a likely match to the spoken utterance conveyed by the signal received at the input.

8. An adaptive speech recognition system as defined in claim 6, wherein said transcription selector module is operative for substituting with the certain transcription a transcription in the dictionary transcription group corresponding to the vocabulary item vocabulary item selected from the speech recognition dictionary as being a likely match to the spoken utterance conveyed by the signal received at the input.

9. An adaptive speech recognition system as defined in claim 6, wherein said transcription selector module is operative for scoring the transcriptions in the given orthographic group to select the certain transcription.

10. An adaptive speech recognition system as defined in claim 9, wherein said adaptation module further comprises an augmentor unit for adding transcriptions derived from the signal received at the input to the transcriptions bank.

11. An adaptive speech recognition system as defined in claim 10, wherein said augmentor unit comprises:
   a continuous allophone recognizer unit generating a transcription on the basis of said signal derived from a spoken utterance indicative of a certain vocabulary item;
   means for selectively adding the transcription generated by said continuous allophone recognizer to the orthographic group corresponding to the certain vocabulary item in the transcriptions bank.

12. An apparatus suitable for use in adapting the transcription content of a speech recognition dictionary, the speech recognition dictionary including a plurality of dictionary transcription groups, each dictionary transcription group being associated to a respective word, said apparatus comprising:
   a computer readable storage medium containing a transcriptions bank, said transcriptions bank comprising a plurality of orthographic groups, each orthographic group including a plurality of transcriptions associated with a common word, each orthographic group being associated with a respective label data element allowing to extract the orthographic group from the transcriptions bank on the basis of the label data element, each orthographic group in the transcriptions bank corresponding to a respective dictionary transcription group;
   an input for receiving:
      a) a signal derived from a spoken utterance indicative of a certain word;
      b) a label element from a speech recognizer processing said signal indicative of the certain word;
   a transcription selector module for:
      a) retrieving from the transcriptions bank an orthographic group corresponding to the certain word on a basis of said label element;
      b) processing said signal to select a certain transcription from said orthographic group retrieved in a), said certain transcription being a most likely match to the spoken utterance conveyed by the signal received at the input;
   an output suitable for releasing a signal representative of the certain transcription for insertion in a given dictionary transcription group, said given dictionary transcription group corresponding to the certain word selected from the speech recognition dictionary as being a likely match to the signal received at the input.

13. An apparatus as defined in claim 12, wherein said transcription selector module is operative for processing the orthographic group retrieved in a) on the basis of the signal received at the input to select a set of transcriptions from the given orthographic group, the output being operative for releasing a signal representative of the set of transcriptions for insertion in the given dictionary transcription group.

14. An apparatus as defined in claim 12, wherein said transcription selection module is further operative for scoring the transcriptions in the orthographic group corresponding to the certain word to select the certain transcription.

15. An apparatus as defined in claim 12, further comprising an augmentor unit for modifying the transcriptions bank in said computer readable medium on the basis of the signal derived from the spoken utterance indicative of the certain word.

16. An apparatus as defined in claim 15, wherein said augmentor unit comprises:
   a continuous allophone recognizer unit for generating transcriptions on the basis of said signal derived front the spoken utterance indicative of the certain word;
   a means for selectively adding the transcriptions generated by said continuous allophone recognizer to the orthographic group corresponding to the certain word.

17. An apparatus for modifying a transcriptions bank on the basis of a signal representative of audio information, the transcriptions bank comprising a plurality of orthographic groups, each orthographic group including a plurality of transcriptions associated with a common word, at least some of the transcriptions of the plurality of transcriptions being derived on the basis of a text to transcription module, said apparatus comprising:
   an input for receiving a signal derived from a spoken utterance, said signal having been processed by a speech recognizer and found to be indicative of a certain word;
   a continuous allophone recognizer unit for processing the signal received at the input to derive a transcription corresponding to the signal representative of audio information;
   a processing unit for selectively adding the transcription generated by said continuous allophone recognizer unit to the orthographic group corresponding to the certain word on the basis of predetermined selection rules.

18. An apparatus as defined in claim 17, wherein said transcription is of a type selected from the set consisting of a phonemic transcription and an allophonic transcription.

19. A computer readable storage medium containing a program element to direct a computer to adapt the transcription content of a speech recognition dictionary, the speech recognition dictionary including a plurality of dictionary transcription groups, each dictionary transcription group being associated to a respective word, the computer including:
   memory unit including:
      a) a transcriptions bank, said transcriptions bank comprising a plurality of orthographic groups, each orthographic group including a plurality of transcriptions associated with a common word, each orthographic group being associated with a respective label data element allowing to extract the orthographic group on the basis of the label data element, each orthographic group in the transcriptions bank corresponding to a respective dictionary transcription group;

a processor in operative relationship with said memory unit, said program element instructing said processor to implement functional blocks for:
- a) receiving a signal derived from a spoken utterance indicative of a certain word;
- b) receiving a label element from a speech recognizer processing said signal indicative of the certain word;
- c) retrieving from the transcriptions bank an orthographic group corresponding to the certain word on a basis of said label element;
- d) processing said signal to select a certain transcription from said orthographic group retrieved in c), said certain transcription being a most likely match to the spoken utterance conveyed by the signal;
- e) inserting the certain transcription in a given dictionary transcription group, said given dictionary transcription group corresponding to the certain word selected from the speech recognition dictionary as being a likely match to the siqnal received at the input.

20. A computer readable medium as defined in claim 19, wherein said program element further instructs said processor to implement functional blocks for;

processing the orthographic group corresponding to the certain word on the basis of the signal derived from a spoken utterance indicative of a certain word to select a set of transcriptions;

inserting the set of transcriptions in the given dictionary transcription group.

21. A computer readable medium as defined in claim 19, wherein said program element instructs said processor to score the transcriptions in the orthographic group corresponding to the certain word to select the certain transcription.

22. A computer readable medium as defined in claim 19, wherein said program element instructs said processor to implement a functional block for augmenting said transcriptions bank on the basis of said signal.

23. A computer readable medium as defined in claim 22, wherein said functional block for augmenting said transcriptions bank is operative for:
- a) generating a transcription on the basis of said signal derived from a spoken utterance indicative of a certain word;
- b) adding the transcription generated in a) to the transcriptions bank in the orthographic group corresponding to the certain word.

* * * * *

UNITED STATES PATENT AND TRADEMARK OFFICE
CERTIFICATE OF CORRECTION

PATENT NO. : 6,208,964 B1  
DATED : March 27, 2001  
INVENTOR(S) : Michael Sabourin Page 1 of 1

It is certified that error appears in the above-identified patent and that said Letters Patent is hereby corrected as shown below:

<u>Title page,</u>
Item [54], Title, change "METHOD AND APPARATUS FOR PROVIDING UNSUPERVISED ADAPTATION OF TRANSCRIPTIONS" to -- METHOD AND APPARATUS FOR PROVIDING UNSUPERVISED ADAPTATION OF PHONETIC TRANSCRIPTIONS IN A SPEECH RECOGNITION DICTIONARY --
Item [56], References Cited, OTHER PUBLICATIONS, add the following cited reference:
-- Unleashing the Potential of Human-to-Machine Communication, Matthew Lenning and Douglas Sharp, Telesis Number 97, pp 23-27 --

<u>Column 18,</u>
Line 39, change "snatch" to -- match --

<u>Column 20,</u>
Line 24, change "front" to -- from --

Signed and Sealed this

Seventeenth Day of September, 2002

Attest:

Attesting Officer

JAMES E. ROGAN  
*Director of the United States Patent and Trademark Office*